United States Patent
Merilainen

(10) Patent No.: US 9,481,061 B2
(45) Date of Patent: Nov. 1, 2016

(54) APPARATUS, A FASTENING DEVICE, METHOD AND SYSTEM FOR CLAMPING A PIECE AS WELL AS A FASTENING CLAMP

(71) Applicant: OK-VISE OY, Muurame (FI)

(72) Inventor: Olavi Merilainen, Jyvaskyla (FI)

(73) Assignee: OK-VISE OY, Muurame (FI)

( * ) Notice: Subject to any disclaimer, the term of this patent is extended or adjusted under 35 U.S.C. 154(b) by 0 days.

(21) Appl. No.: 14/890,750

(22) PCT Filed: May 28, 2014

(86) PCT No.: PCT/FI2014/050428
§ 371 (c)(1),
(2) Date: Nov. 12, 2015

(87) PCT Pub. No.: WO2014/191629
PCT Pub. Date: Dec. 4, 2014

(65) Prior Publication Data
US 2016/0144472 A1    May 26, 2016

(30) Foreign Application Priority Data

May 31, 2013    (FI) ..................................... 20135604

(51) Int. Cl.
| | |
|---|---|
| *B25B 1/24* | (2006.01) |
| *B23Q 3/06* | (2006.01) |
| *B25B 1/02* | (2006.01) |
| *B25B 1/10* | (2006.01) |
| *B25B 1/12* | (2006.01) |

(Continued)

(52) U.S. Cl.
CPC ............... *B23Q 3/066* (2013.01); *B23Q 1/445* (2013.01); *B23Q 3/10* (2013.01); *B23Q 3/104* (2013.01); *B25B 1/02* (2013.01); *B25B 1/10* (2013.01); *B25B 1/12* (2013.01)

(58) Field of Classification Search
CPC ......... B25B 1/02; B25B 1/224; B25B 5/067; B25B 5/082; B25B 5/163
See application file for complete search history.

(56) References Cited

U.S. PATENT DOCUMENTS

| | | | |
|---|---|---|---|
| 5,324,013 A | 6/1994 | Marino | |
| 5,595,378 A * | 1/1997 | Martinsson | ............. F16B 2/065 269/152 |

(Continued)

FOREIGN PATENT DOCUMENTS

| | | |
|---|---|---|
| GB | 2130933 | 6/1984 |
| GB | 2178985 | 2/1987 |

OTHER PUBLICATIONS

International Search Report, International Application No. PCT/FI2014/050428, dated Oct. 9, 2014.

*Primary Examiner* — Lee D Wilson
(74) *Attorney, Agent, or Firm* — Fildes & Outland, P.C.

(57) ABSTRACT

Apparatus for clamping a piece, includes a frame portion adapted to be fastened to a base, a fastening clamp fitted to foe frame portion having first and second jaw components on the opposite sides and a wedge member fitted therebetween, fixing stopper. The piece is adapted to be clamped between the first jaw component of the fastening damp and the fixing stopper. An arrangement is disposed between the second jaw component of foe fastening clamp and the fixing stopper, functionally connecting these to each other, for moving the fixing stopper by way of the fastening clamp. In addition, the apparatus is related to a fastening device, a method and a system for clamping a piece as well as a fastening clamp for a fastening device.

12 Claims, 11 Drawing Sheets

(51) Int. Cl.
  *B23Q 3/10*   (2006.01)
  *B23Q 1/44*   (2006.01)

(56) References Cited

U.S. PATENT DOCUMENTS 6,659,439 B1   12/2003   Baumgartner et al.
6,896,249 B1 *  5/2005   Ferrara .................... B25B 1/12
                                                269/138
8,066,270 B2 * 11/2011   Siegel ................... B25B 1/2421
                                                269/272
8,276,895 B2 * 10/2012   Brown ............... B23K 37/0435
                                                269/210
2016/0144472 A1 * 5/2016  Merilainen ............... B25B 1/02
                                                29/559

* cited by examiner

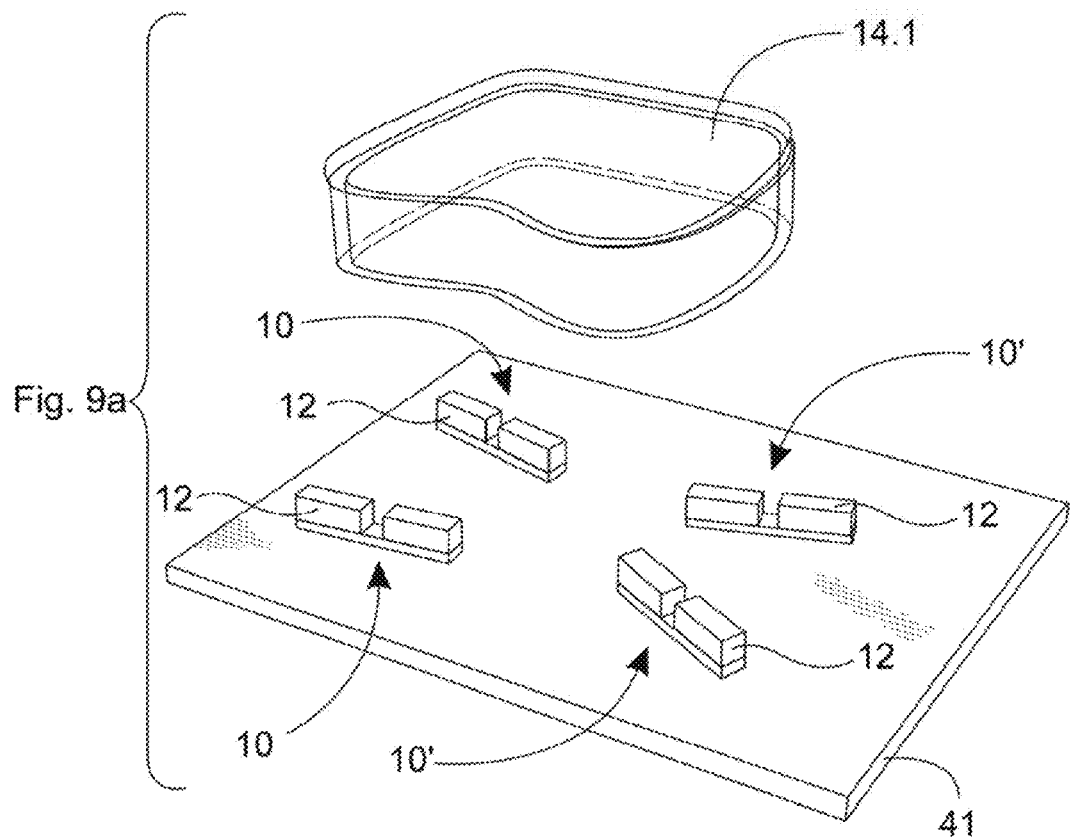
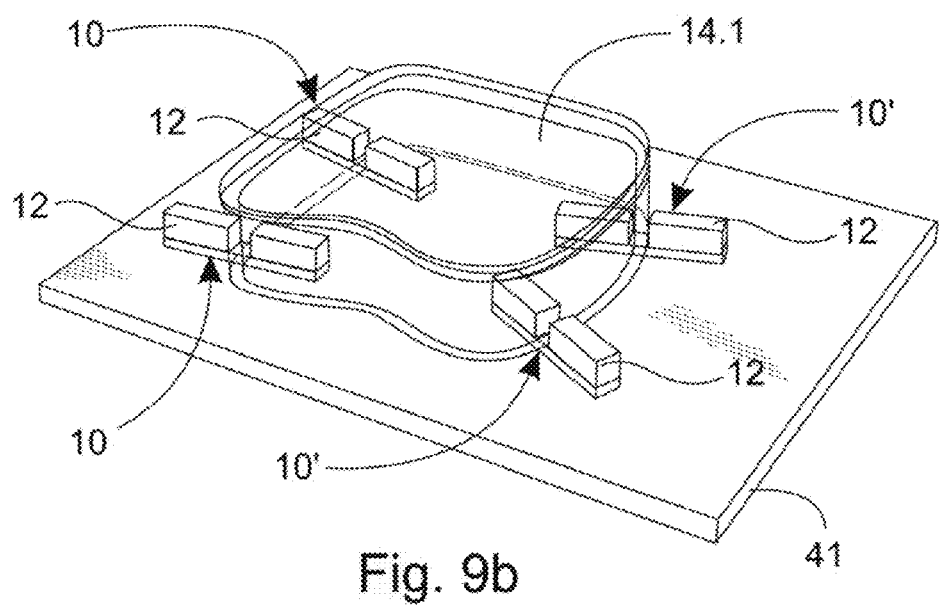

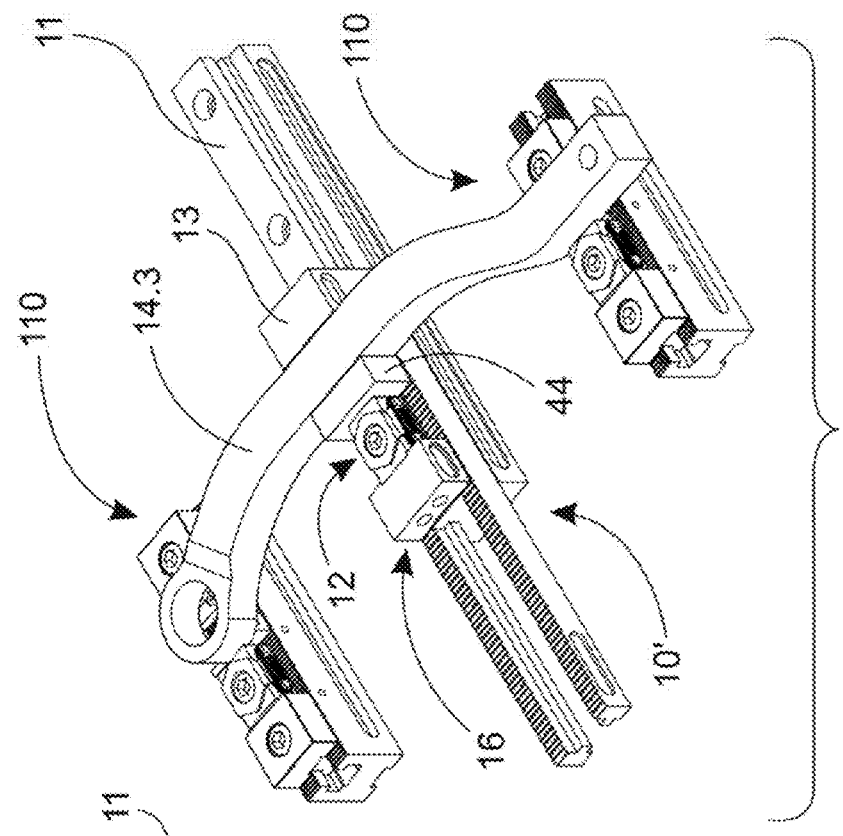
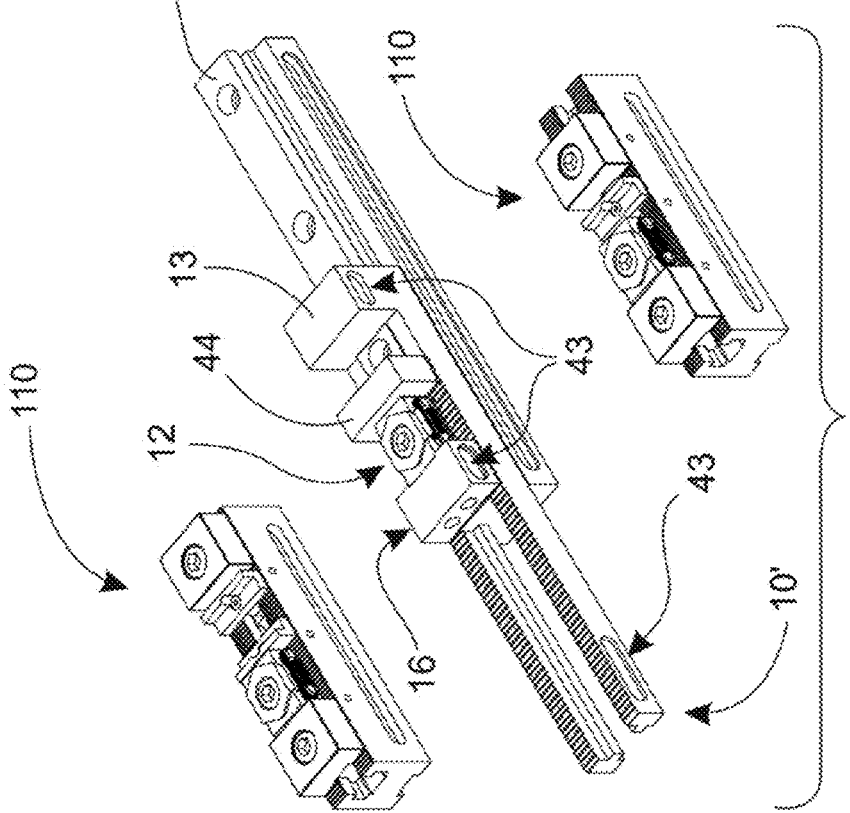

APPARATUS, A FASTENING DEVICE, METHOD AND SYSTEM FOR CLAMPING A PIECE AS WELL AS A FASTENING CLAMP

TECHNICAL FIELD

The invention relates to an arrangement for clamping a piece, said arrangement including
a frame portion adapted to be fastened to a base,
a fastening clamp fitted to the frame portion, said fastening clamp having first and second jaws on the opposite sides and a wedge member fitted therebetween,
a fixing stopper,
and wherein the piece is adapted to be clamped between the first jaw of the fastening clamp and the fixing stopper. Other objects of the invention include a fastening device, a method and a system for clamping a piece as well as a fastening clamp. clamping a piece to a machine tool. An example of these is the

BACKGROUND OF THE INVENTION

Various clamping arrangements are known as prior art for clamping a piece to a machine tool. An example of these is the clamping arrangement of the present applicant, marketed under the name Multi-Rail RM System, see http://www.ok-vise.com/images/stories/pdf/okvise_multirail_s4_v1_eng_small.pdf (printed on 29, May 2013, the printout archived by the applicant). Its basic component is a rail-like frame equipped with a fastening groove for the fixing stopper and the fastening clamp. The fixing stopper and the fastening clamp are fixedly mounted to the rail and the piece is clamped between these with the fastening clamp. The aforementioned arrangement is adequate in many clamping situations; however, it lacks the centralising property, for example.

Another method of clamping a piece by means of one-sided clamping is to use a screw clamp. However, a disadvantage of such screw clamps is their poor ergonomics during use. In certain clamping situations, the screw rod of the screw clamp may extend far from the machining tool. This causes ergonomic disadvantages, for example, when a heavy piece is mounted to the screw clamp for machining. In this case, a far-extending rod hinders the process of bringing and mounting the piece to the screw clamp as well as its removal.

A third clamping arrangement known as prior art are centralising screw clamps which enable centralising clamping of pieces. In these, the frame of the fastening device includes two clamping jaws adapted to move relative to the frame. The clamping jaws are connected to each other with a turnable screw rod.

Each of the solutions known as prior art only offers individual clamping modes. This creates the need to change the fastening device if the clamping mode of the piece changes. This binds workforce and time resources, which are thus away from the operating time of a cost-intensive machine tool. In addition, known clamping solutions are also associated with ergonomic disadvantages, for instance, owing to high-profile clamping jaws, particularly with heavy pieces.

SUMMARY OF THE INVENTION

An object of this invention is to provide an arrangement for clamping a piece, said arrangement being compact for its design and enabling several characteristics in one arrangement by making small changes. Another object of the invention is to provide a fastening device and a method for clamping a piece, a fastening damp for the arrangement and the fastening device, and a system for clamping a piece to a machine tool.

In the invention, an arrangement is disposed between the fastening clamp and the fixing stopper for moving the fixing stopper by means of the fastening clamp. Thus, the fastening clamp, whose first jaw component acts as the clamping jaw for clamping the piece, can also be used to act on the second clamping jaw for moving it relative to the frame. The movement of the second jaw component provided by the wedge member of the fastening clamp can be transmitted to the other side of the piece to be clamped, to the second clamping jaw. This allows moving both clamping jaws with a simple and compact mechanism. Since the arrangement and the fastening device are low and short constructions, mounting and removing pieces is ergonomic. In addition, the number of wearing parts in the arrangement and device according to the invention is non-existent or at least wearing of the parts is reduced.

Owing to the invention, several characteristics can be provided with the same simple structural solution including only few parts by using simple and quick modifications. According to a first embodiment, the invention enables a floating clamping mode for the piece. According to a second embodiment, the invention also enables a centralising clamping mode for the piece. According to a third embodiment, the invention further enables the traditional one-sided clamping mode for the piece, wherein clamping can be provided from the side of the integrated clamping jaw. Thus, several different clamping modes can be provided with the same arrangement and device. In this way, for example, unnecessary exchange of fastening devices is avoided and advantages are thus gained via a faster piece replacement in the machine tool. Other additional advantages achieved with the invention become apparent from the description, and the characteristics are set forth in the claims.

BRIEF DESCRIPTION OF THE DRAWINGS

The invention, which is not limited to the embodiments set forth below, is described in more detail by making reference to the appended drawings, in which FIGS. 9a, and 9b, show an example of the basic principle of clamping a bowl-like piece with the arrangement, FIGS. 11a, and 11b, show a second example of the basic principle of the floating clamping mode of a piece.

DETAILED DESCRIPTION OF THE INVENTION

Figure 1:
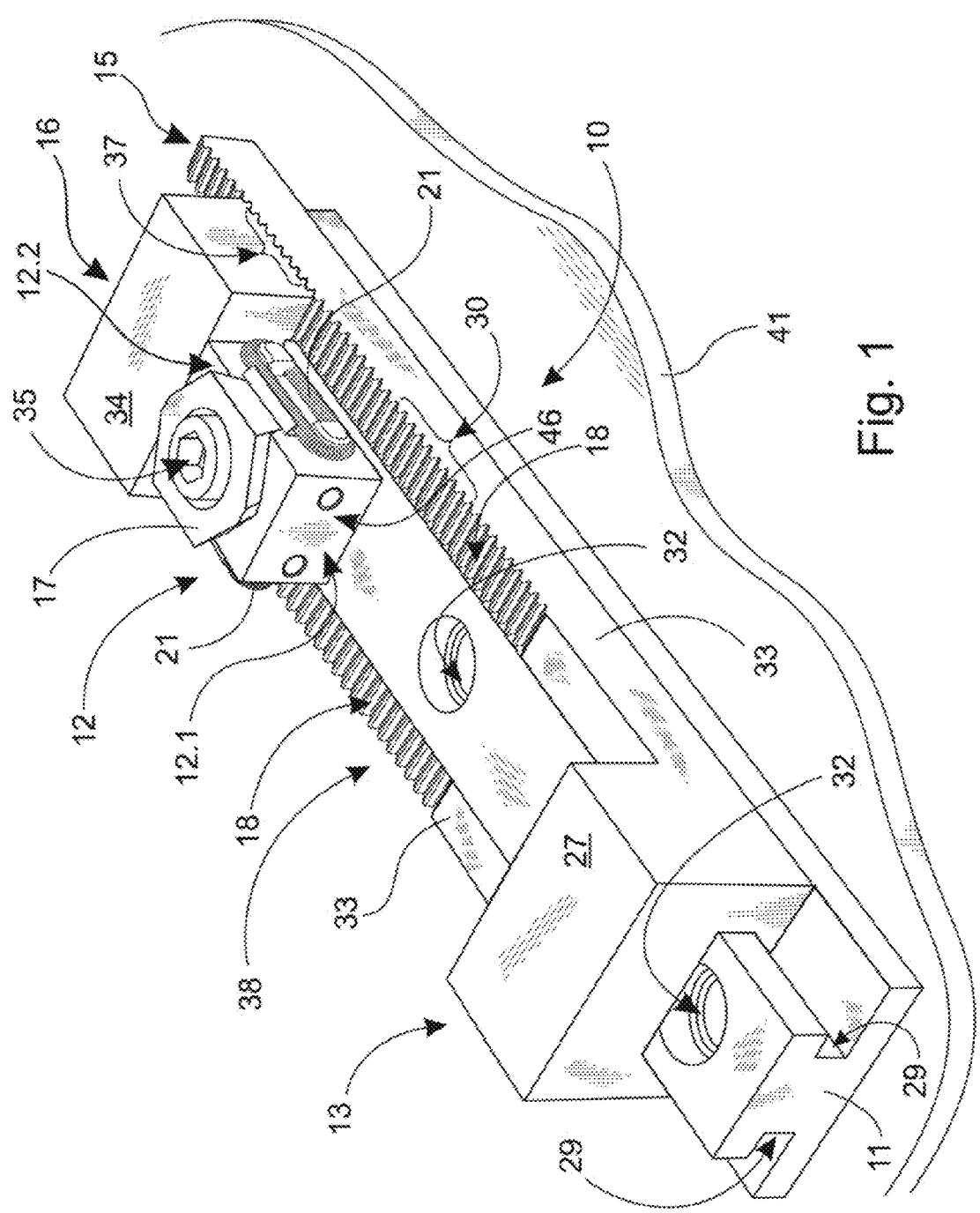
FIG. 1 shows an axial view of an exemplifying
Figure 2:
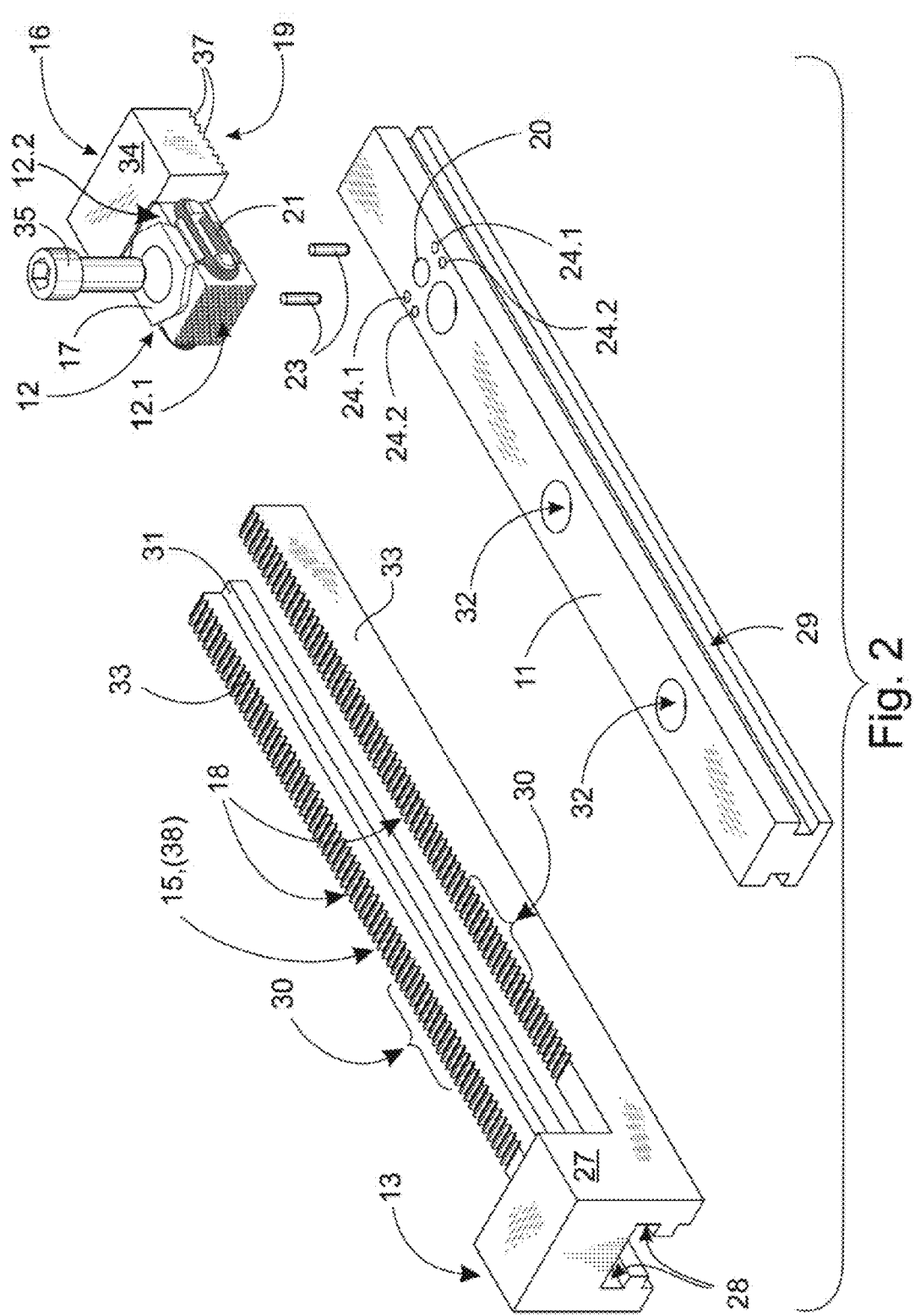
FIG. 2 shows an exploded view of an arrangement according to the principle of FIG. 1.

FIG. 1 shows an exemplifying embodiment of an arrangement and fastening device 10 for clamping a workpiece, and FIG. 2 shows an exploded view of the arrangement and device 10 with the components separated from each other. In the basic design, the arrangement and fastening device 10 include a frame portion 11, a fastening clamp 12 fitted to the frame portion 11, and a fixing stopper 13. The material of the components 11-13 can be metal, for instance.

As shown in FIG. 2, according to an embodiment, the frame portion 11 can be an elongated rail component, for example. The frame 11 having an I-shaped cross-section, for example, has fixing openings 32 for fastening the arrangement and device 10 to a drilled matrix bench 41 of a machine tool 40, a T-groove plate or generally to a base, with fixing screws. The base 41, to which the frame portion 11 of the arrangement and device 10 is fastened, can be said to have a characteristic level. The frame 11 has elongated grooves 29 on the opposite sides for an arrangement 38, which will be described later. In addition, the frame 11 has at least one bore 20 equipped with a screw thread, more generally, at least one position for the fastening clamp 12. The frame 11 can also include, for example, bores 24.1, 24.2 or equivalent for the positioning pins 23 or equivalent elements of the fastening clamp 12. With these, it is possible to mount a desired part of the fastening clamp 12 to the frame portion 11 rigidly, i.e. in a positioned manner. These can be used to enable several clamping modes, as will be shown later in the description.

For example, the fastening clamp 12 can be a wedge-activated low-profile clamp known as prior art. The operating principle of one wedge-activated low-profile clamp is described in FI patent No. 76012. The wedge clamp 12 has first and second jaw components 12.1, 12.2, relative to each other, on the opposite sides and a wedge member 17 fitted in the middle between the jaw components 12.1, 12.2. The components 12.1, 12.2 of the fastening clamp 12 and the member 17 are generally successively located in the direction determined by the base 41. The back and forth movement of the wedge member 17 between the jaws 12.1, 12.2 can be used to act on the jaws 12.1, 12.2 to move them. Normally, this movement also takes place in the direction determined by the base 41.

When the wedge member 17 is pushed down between the jaw components 12.1, 12.2, it pushes the jaws 12.1, 12.2 to separate them from each other. Since spring members 21 connecting the jaw components 12.1, 12.2 are fitted between these on both sides of the clamp 12, the jaws 12.1, 12.2 return towards each other when the wedge member 17 rises upwards between the jaw components 12.1, 12.2. The movement of the wedge member 17 is provided with a fixing screw 35, which can also be used to mount the fastening clamp 12 to the frame portion 11, to the bore 20 adapted for it. It will be evident to those skilled in the art that the size and the design of the components, as well as the jaws of the fastening clamp 12 can vary. Thus, the design of the fastening clamp proposed in this application is not intended in any way to exclude other known fastening clamps or those under development or based on the same operating principle.

Figure 3:
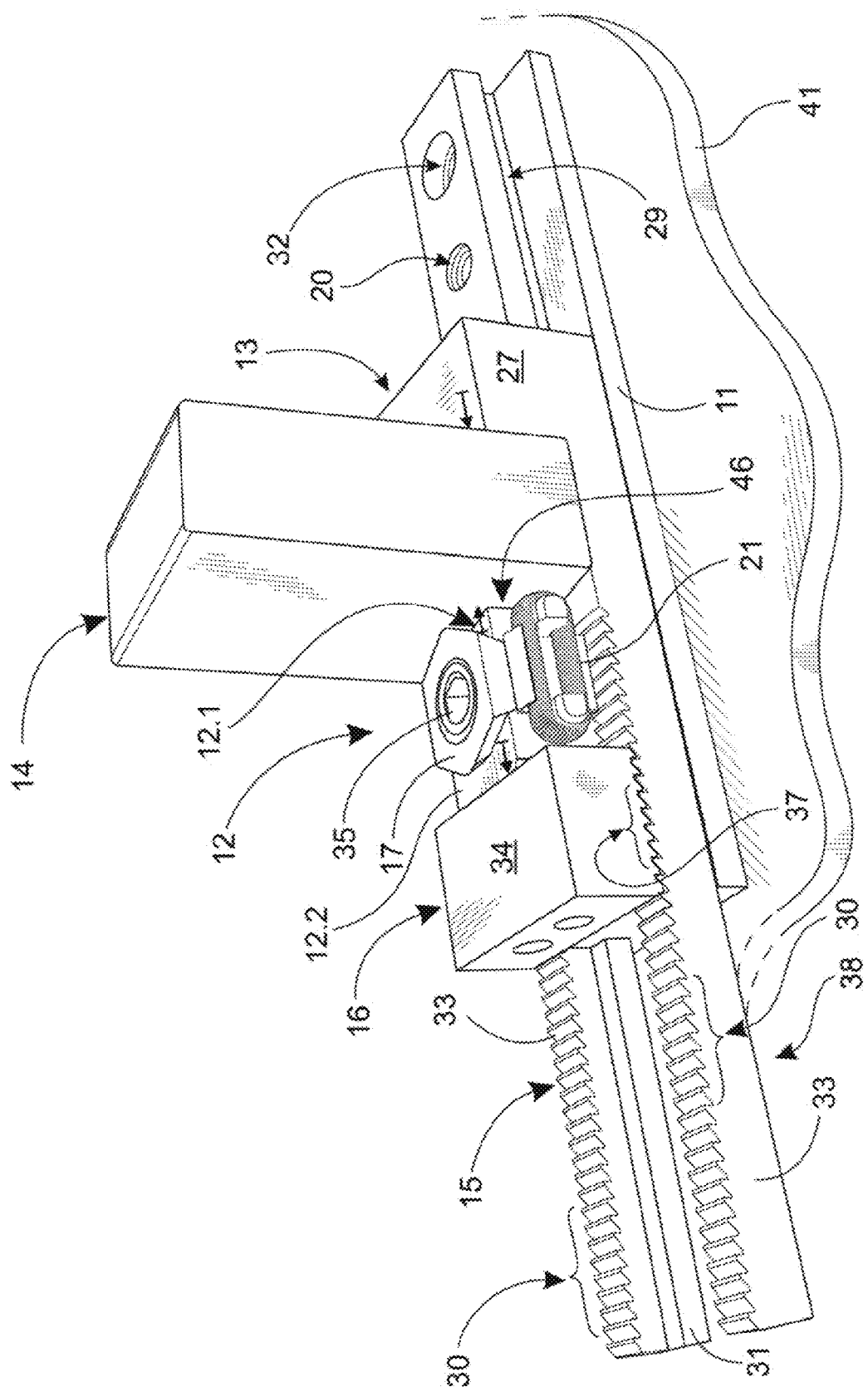
FIG. 3 shows an axial view of an example for clamping of a piece.

FIG. 3 shows an example of the arrangement and the fastening device 10 in one of their operating conditions. Clamping a piece 14 to the arrangement and the fastening device 10 takes place between the first jaw component 12.1 of the fastening clamp 12 and the fixing stopper 13. For this, the fixing stopper 13 and the fastening clamp 12 are functionally connected to each other by fitting an arrangement 38 between the fastening clamp 12 and the fixing stopper 13 for moving the fixing stopper 13 by means of the fastening clamp 12. Here, "connection" refers to that action directed to one part 12 also causes a moving effect on the other part 13 located on the opposite side of the piece 14 clamped, relative to the fastening clamp 12. From the fastening clamp 12, its second clamping jaw 12.2 can abut and thus act on the arrangement 38. Thus, parts 12, 13 have a structural force-transmitting connection, which moves the other part 13 relative to the frame 11 of the arrangement and device 10. With the arrangement 38, the position of the fixing stopper 13 can be varied relative to the frame 11, for example, when clamping the piece 14 to the arrangement and device 10 by means of the fastening clamp 12.

According to an embodiment, the arrangement 38 for functionally connecting the fixing stopper 13 and the fastening clamp 12 to each other may include a slide 15 moveably fitted to the frame portion 11. Instead of the slide 15, the same can be provided, for example, with an equivalent reaction member adapted to move linearly along the frame 11, for which member the frame 11 composed of one or more parts may provide a track enabling the linear movement. A fixing stopper 13 is now also integrated in the slide 15. With the slide 15 mounted to the frame portion 11, the fastening clamp 12 acts on the slide 15 by moving it linearly and thus also on the fixing stopper 13 integrated in the slide 15. Thus, the movement of the fixing stopper 13 is provided from the other side of the piece 14 to be clamped by means of the fastening clamp 12.

In the case according to the embodiment, the slide 15 is also an elongated metal component. The slide 15 is composed of two adjacent elongated bars 33 located at a distance from each other. The bars 33 are equipped with projections 31 in the longitudinal direction of the bar 33, oriented against each other. The projections 31 fit in the grooves 29 of the frame 11 providing thus a dimensionally accurate, form-lockable connection with small clearance, between the frame 11 and the slide 15. There the slide 15 can easily slide on the frame 11 in its longitudinal direction. The fixing stopper 13 is now a metal component 27 integrated in the slide 15 connecting the bars 33 at one end of the slide 15. At the fixing stopper 13, the slide 15 is equipped with a groove 28 adaptable to the frame portion 11.

The slide 15 enables easy and quick adjustment of the fixing gap arranged for the piece 14 over a wide range. According to an embodiment, the slide 15 may be adjustable for the pieces 14 between 0, and 130, mm, for example. Thus, the length of the frame 11 of the device 10 can be, for instance, 250, mm; the length of the device during the clamping condition is obtained by adding to this dimension the protruding dimension of the slide 15 from the frame 11. It will be evident to those skilled in the art that the dimensions of the arrangement and device 10 are not limited to this individual exemplifying embodiment.

In the case according to the embodiment, a support stopper 16 can be removably fitted to the slide 15 for the fastening clamp 12. The second jaw component 12.2 of the fastening clamp 12 can be fitted to abut on this support stopper 16. Thus, this second jaw component 12.2 is adapted to act on the arrangement 38 from the fastening clamp 12. When the jaw 12.2 abuts on the support stopper 16, it applies a force thereto, which is further transmitted to the slide 15. By the effect of the force, the slide 15 moveably fitted to the frame portion 11 can move along the frame 11. When the slide 15 moves, the fixing stopper 13 fitted thereto, located on the other side of the piece 14 relative to the fastening clamp 12, also moves. The direction of the movements and forces is parallel with the characteristic level determined by the base 41. The support stopper 16 can be a separate metal component 34, but it can also be connected to the fastening clamp 12.

Compatible bonding profiles 18, 19 are disposed in the support stopper 16 and the slide 15 for adjusting the distance between the fixing stopper 13 and the fastening clamp 12. According to an embodiment, the bonding profiles 18, 19 may enable rapid coarse adjustment of the distance between the stopper 13 and the clamp 12 in a discontinuous or stepwise manner. This makes the mounting of the piece 14 faster. According to an embodiment, the position of the clamp 12 and thus that of the support stopper 16 fastened thereto can also be varied relative to the frame 11, as will be explained later in this description.

Toothings 30, 37 engageable with each other and presented in the case according to the embodiment may act for example as the bonding profiles 18, 19. The toothings 30, 37 can additionally be even chamfered, which makes the bonding between the support stopper 16 and the slide 15 more reliable and the setting is also faster. Chamfered toothing, which may be a few degrees (for example, 3°, ), as if "sucks" the pieces 15, 16 in contact with each other. In the slide 15, the chamfered toothing 30 is oriented towards the fixing stopper 13 and, correspondingly, in the support stopper 16, compatibly towards the opposite direction relative to the toothing 30 of the slide 15. The toothing 30, 37 can of course also be straight.

In the slide 15, the toothing 30 is now on the upper surface of both bars 33. Thus, it is approximately on the top surface level of the frame 11. In the support stopper 16, the toothing 37 is on its lower surface (FIGS. 2 and 4) at the opposite edges. A plane area remains in the component 34, between the toothings 37, said area being on the upper surface of the frame 11 when the support stopper 16 is mounted in the arrangement and device 10.

According to another embodiment, the arrangement and device 10 can be implemented even without a specific support stopper component 34. In this case, the toothing or an equivalent bonding system adaptable to the slide 15 can be fitted in the second jaw component 12.2 of the fastening clamp 12, for example. There, the jaw component 12.2 can be slightly wider, in which case it also extends to the toothed area 18 of the slide 15 and acts as a support stopper itself. However, an embodiment implemented with a specific support stopper component 34 is more advantageous in that it is easier to get a grip on the support stopper component 34 when the position of the slide 15 is changed relative to it. In addition, an embodiment implemented with a specific support stopper component 34 enables using the fastening clamp 12 known as prior art in the arrangement and device 10, because in this case, the bonding profiles 19 of the support stopper 16 are differentiated to the support stopper component 34 and the second jaw component 12.2 can be any component known from fastening clamps 12. To improve getting the grip, the components 27, 34 and/or the slide 11 as well may have bonding cavities on their lateral surfaces (reference numbers 43 in FIG. 11a) for moving the parts 13, 15, 16 relative to each other with a thumb and index finger grip.

Figure 4:
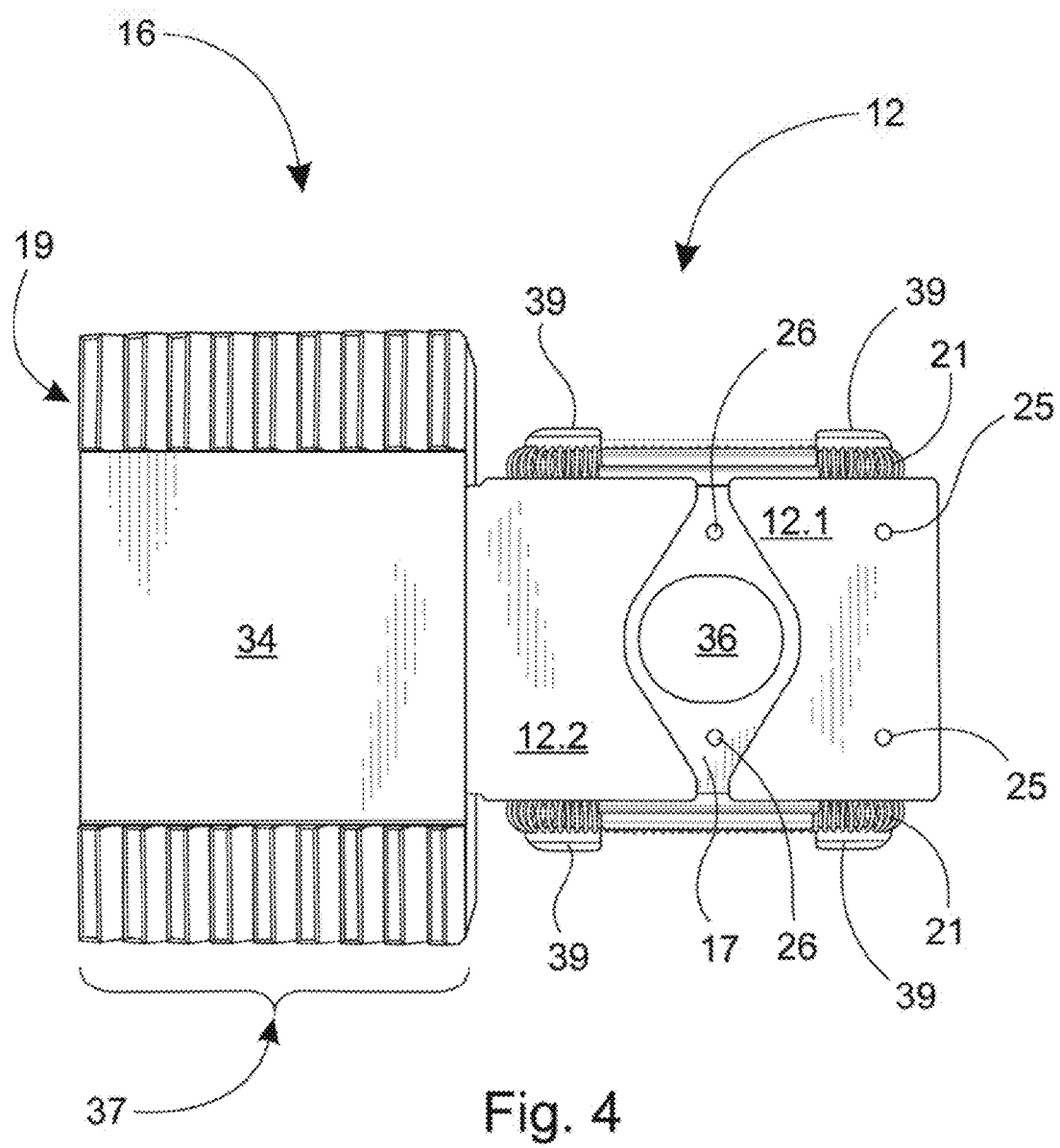
FIG. 4 shows a bottom view of an example of the fastening clamp and its support stopper.
Figure 5:
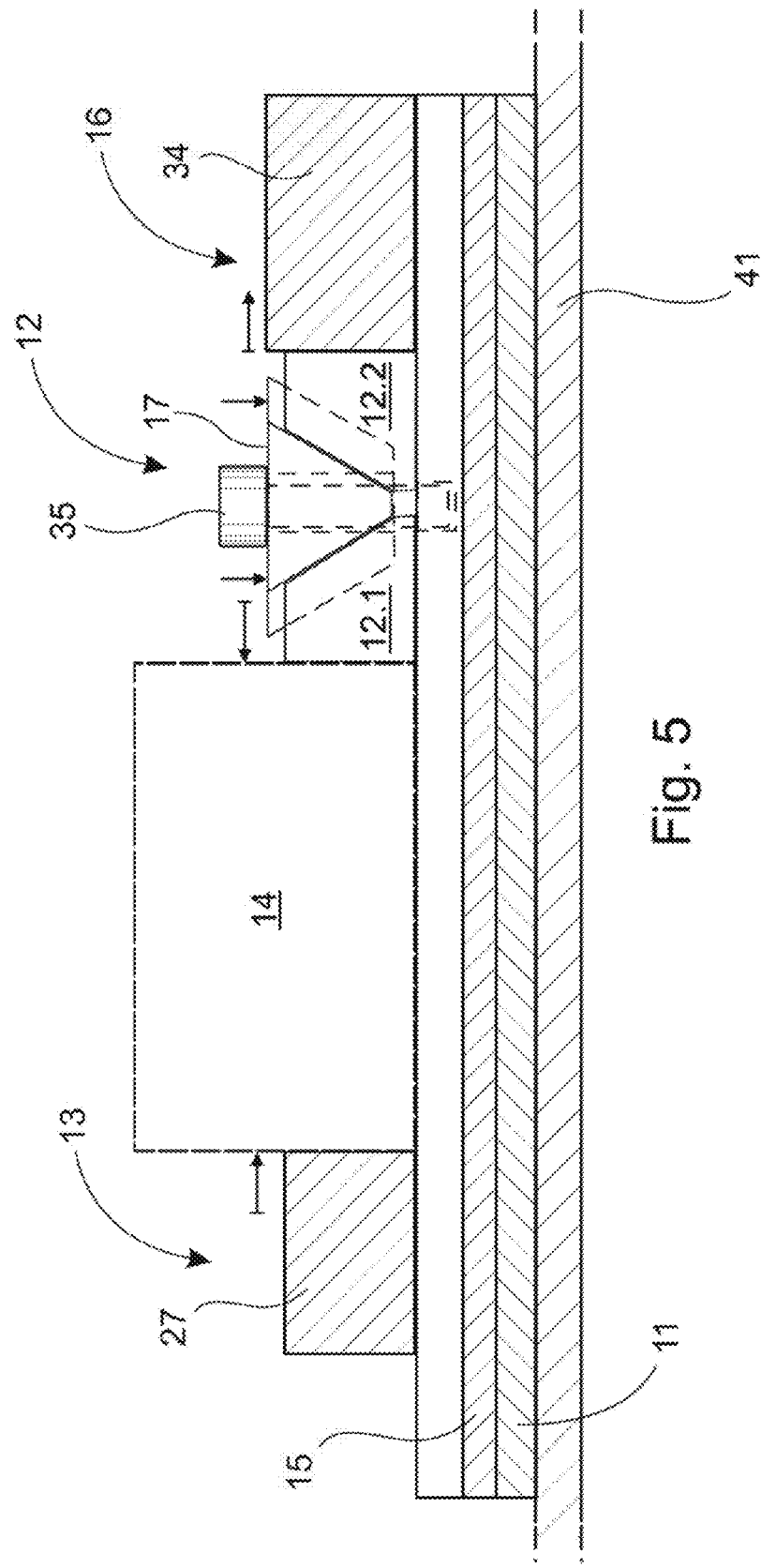
FIG. 5 shows an example of the floating clamping mode of a piece seen as a lateral view of the arrangement.

The invention surprisingly enables several different clamping modes with the same arrangement and device 10, which will be described in more detail below. With different arrangement methods of the fastening clamp 12 to the frame portion 11, different clamping modes can be provided. According to a first embodiment, the fastening clamp 12 can be floatingly fitted to the frame portion 11 (floating mode). In this case, the clamping gravitates around the piece 14. FIG. 5 shows an example of this. Now the arrangement is cross-sectionally cut in its longitudinal direction at the level of the edge of the fastening clamp 12. For the sake of clarity, the spring connecting the jaw components 12.1, 12.2 including its accessories (side plate and fastening pins 39 for the jaw components, FIG. 4) are not shown in the fastening clamp 12. The fastening clamp 12 can be mounted to the frame portion 11 using a bolt 35, for example, which goes through the opening 36 in the wedge member 17 (FIG. 4). Since the opening 36 in the wedge member is slightly elliptical in the longitudinal direction of the frame 11, the fastening clamp 12 can have a slight "play" relative to the bolt 35 when clamping the piece 14. When loosely fastened to the frame 11 in this way, the fastening clamp 12 has a slight clearance of a few millimetres. This clearance enables the floating clamping mode for the piece 14.

FIGS. 9a,, 9b, and 10 show a few examples of clamping applications, in which the floating clamping mode can be applied. Thus, fixing is positioned at the location of the piece 14.1. In FIGS. 9a, and 9b,, a bowl-like cast piece 14.1 is fixed in place with four fastening devices 10. FIG. 9a shows the fastening arrangement before clamping the piece 14.1 and FIG. 9b, shows the condition after clamping the piece 14.1. At least two fastening devices 10' are used to floatingly clamp the piece 14.1. The other fastening devices 10 can be, for example, devices shown in FIG. 7 with one-sided clamping; the operating principle of these will be explained later in the application. The fastening devices 10 can as well be replaced with practically any clamping mode, such as the traditional rail clamp.

Figure 10:
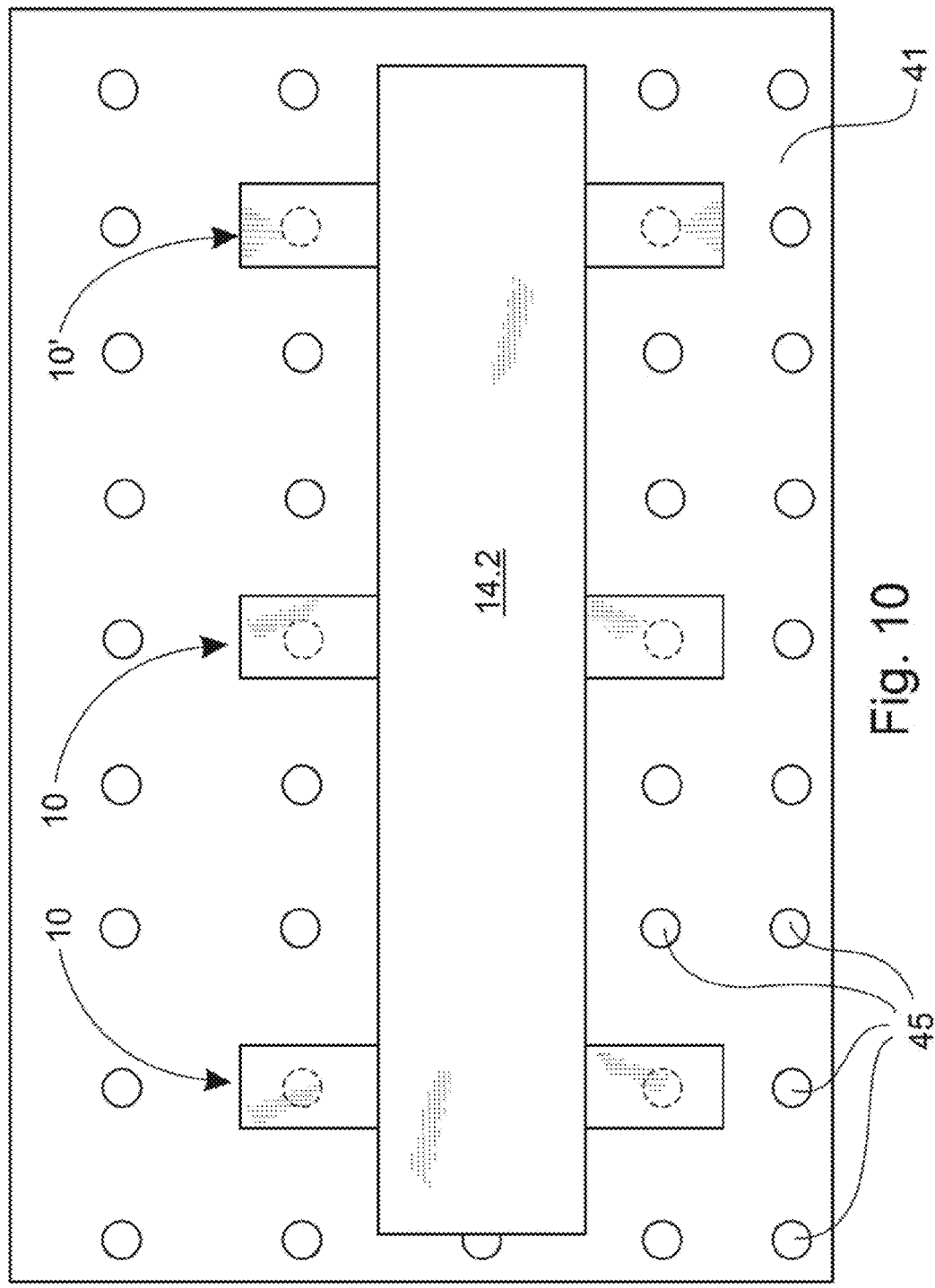
FIG. 10 shows an example of the basic principle of the floating clamping mode of a piece.

In FIG. 10, an elongated piece 14.2 is clamped with three fastening devices 10, 10'. In particular, if the piece 14.2 is cast, it may have dimensional deviations and thereby lack of precision. In this case, at least one fastening device 10' can provide the floating clamping mode for the piece 14.2. Various stress states existing in the piece 14.2 may also be a reason for using the floating clamping mode. Owing to the floating mode, the fastening device 10 will not distort the piece 14.2, and the final product will thus be dimensionally more accurate than before. FIG. 10 also shows the fixing stoppers 45 of the base 41. The devices 10, 10' can be fastened to these with bolts, for example, via their fixing openings 32 in the frame 11.

Figure 6:
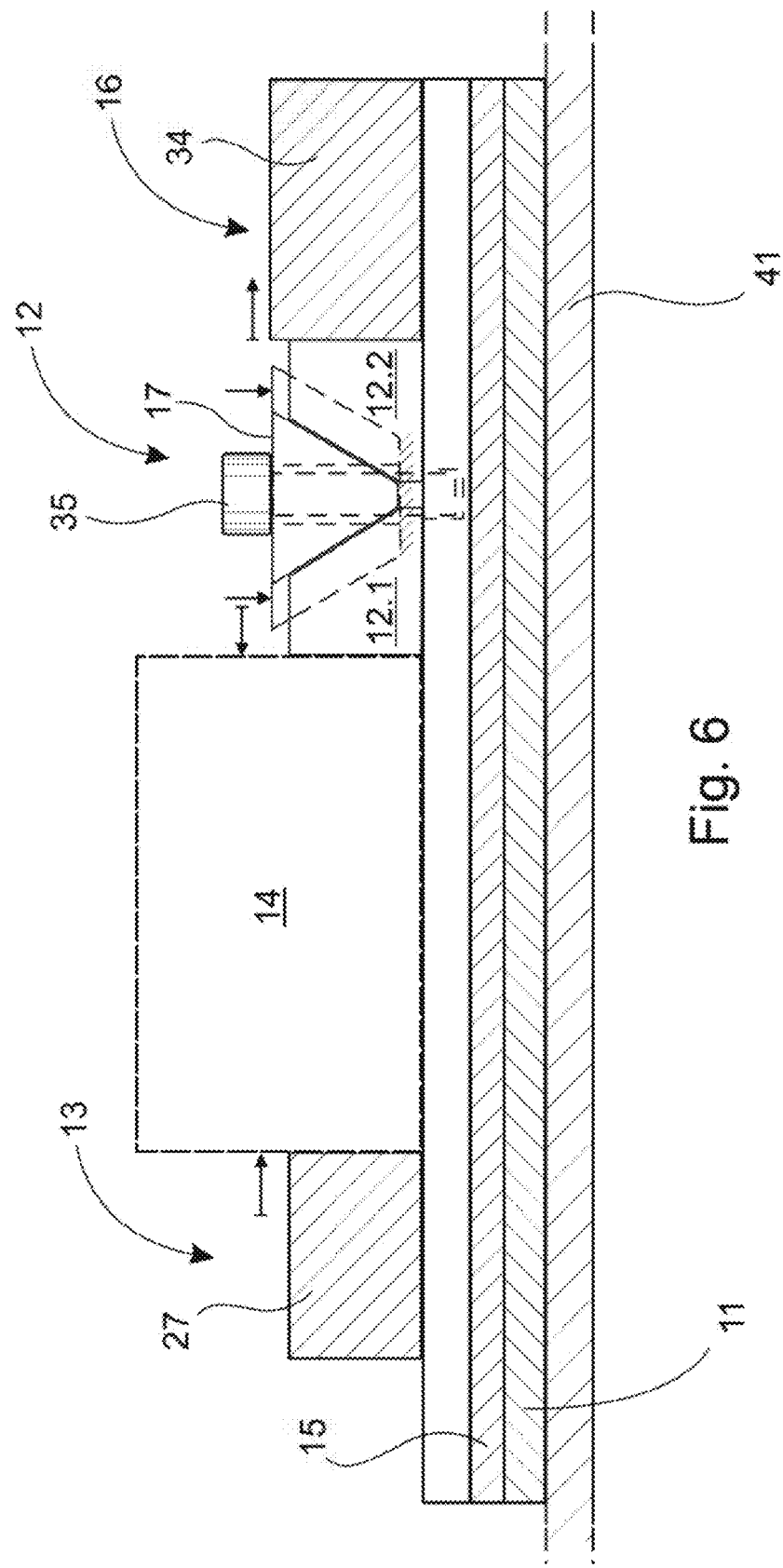
FIG. 6 shows an example of the centralising clamping mode of a piece seen as a lateral view of the arrangement.

Instead of the floating clamping mode, at least part of the fastening clamp 12 can be fitted to the frame portion 11 in an essentially positioned way. By appropriately selecting the positioned part of the fastening clamp 12, different clamping modes are again achieved. According to a first embodiment, the part of the fastening clamp 12 positioned in the frame portion 11 can be its wedge member 17. FIG. 6 shows the principle of this. Here, the diagonal line area below the wedge member 17 indicates its fixation to the frame portion 11 in a positioned way. Here, too, the fastening clamp 12 is mounted to the frame portion 11 with a bolt 35 like in the embodiment of FIG. 5, but, in addition to this, the wedge member 17 of the fastening clamp 12 may be locked in place immovably, i.e. in a positioned way.

For the positioning of the wedge member 17, for example bores 24.1, 26, to which pins 23 can be fitted (FIG. 2), can be disposed in the frame 11 of the arrangement and device 10 (FIG. 2) and on the bottom surface of the wedge member 17 as well (FIG. 4). The bores 24.1, 26 are set in alignment with the bolt hole 20 for the wedge member 17 fitted to the frame portion 11. Thus, they centralise the wedge member 17 to the bolt hole 20 and the wedge member 17 can no longer have a slack motion when clamping the piece 14, as was the case in the floating application previously described. In this way, the arrangement and device 10 can be made into a centralising clamp (centralising mode), in which parts 46, 13 functioning as fixing stoppers move in a concentrated manner. Both fixing stoppers 46, 13 then move synchronically when the wedge member 17 of the fastening clamp 12 is pushed towards the frame portion 11. It is to be noted that the bores 24.1, 26 and the locking pins 23 are only one exemplifying method for implementing the positioning of the wedge member 17. According to a second embodiment, a centralising sleeve can also be fitted to the opening 36 of the wedge member 17, around the head of the bolt 35. This can also prevent the "slack motion" of the wedge member 17 around the bolt 35.

Figure 7:
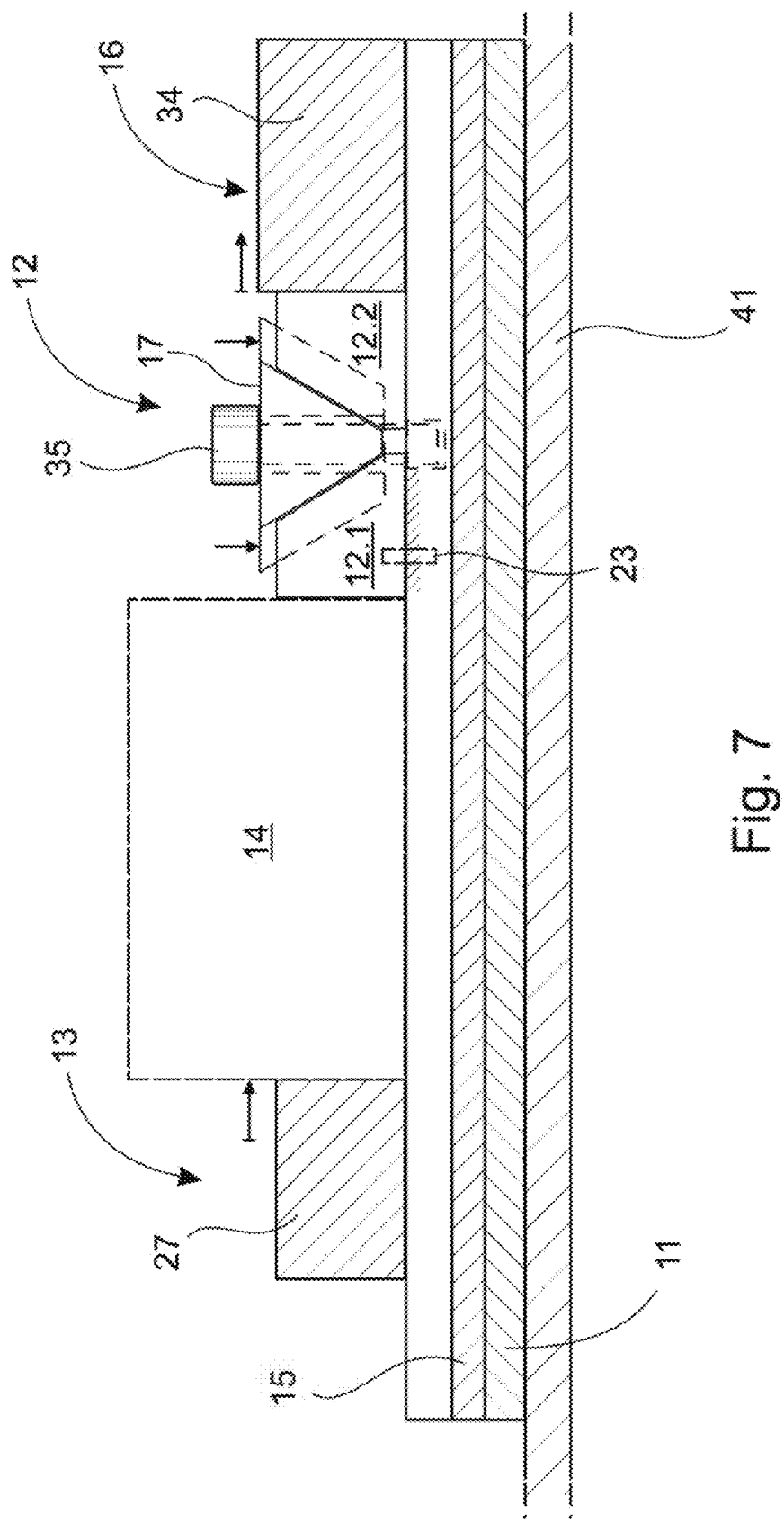
FIG. 7 shows an example of the one-sided clamping mode of a piece seen as a lateral view of the arrangement.

According to a further embodiment, the part fixedly positioned to the frame portion 11 of the fastening clamp 12 may be its first jaw component 12.1, which abuts on the piece 14 to be clamped to the device 10. FIG. 7 shows an embodiment of this. Now, bores 24.2, 25 or equivalent may be disposed in the frame 11 (FIG. 2) as well as on the lower surface of the clamping jaw 12.1 (FIG. 4) and positioning pins 23 or equivalent can be fitted to these bores. The bore arrangement 24.2 disposed in the frame portion 11 is now set laterally slightly offset from the bolt hole 20 in the longitudinal direction of the frame 11. Thus, it is in alignment with the bores 25 disposed on the lower surface of the clamping jaw 12.1 and then the clamping jaw 12.1 cannot move when clamping the piece 14. In this way, the arrangement and device 10 can be made such as to clamp the piece 14 on one side only (machine vise mode). When the wedge member 17 of the fastening clamp 12 is pushed towards the frame portion 11 between the jaw components 12.1, 12.2, the clamping jaw 12.2 pushes the support stopper 16. In turn, the support stopper 16 moves the slide 15 and the fixing stopper 13 disposed in the slide on the other side of the piece 14. The clamping jaw 12.1 of the fastening clamp 12 on the side of the piece 14 remains in place owing to the positioning pins 23.

The positioning members 23 of the wedge member 17 and the jaw component 12.1 are easily mountable to and removable from the arrangement and device 10. It is sufficient that the relatively small fastening clamp 12 is removed from the frame 11 by opening one fixing screw 35, after which the pins 23 can be placed in the bores 24.1, 24.2 disposed in the frame portion 11. After this, the fastening clamp 12 is simply set back in place aligning the heads of the pins 23 with the bores 26, 25, which are selected depending on whether the centralising mode or the machine vise mode clamping is desired. Finally, the fixing screw 35 of the fastening clamp 12 is set back in place to the bore 20 through the wedge member 17. Thus, the operating mode of the arrangement and device 10 can be changed in a simple and quick manner compared to, for example, that the entire device would need to be replaced in the machine tool.

Figure 8:
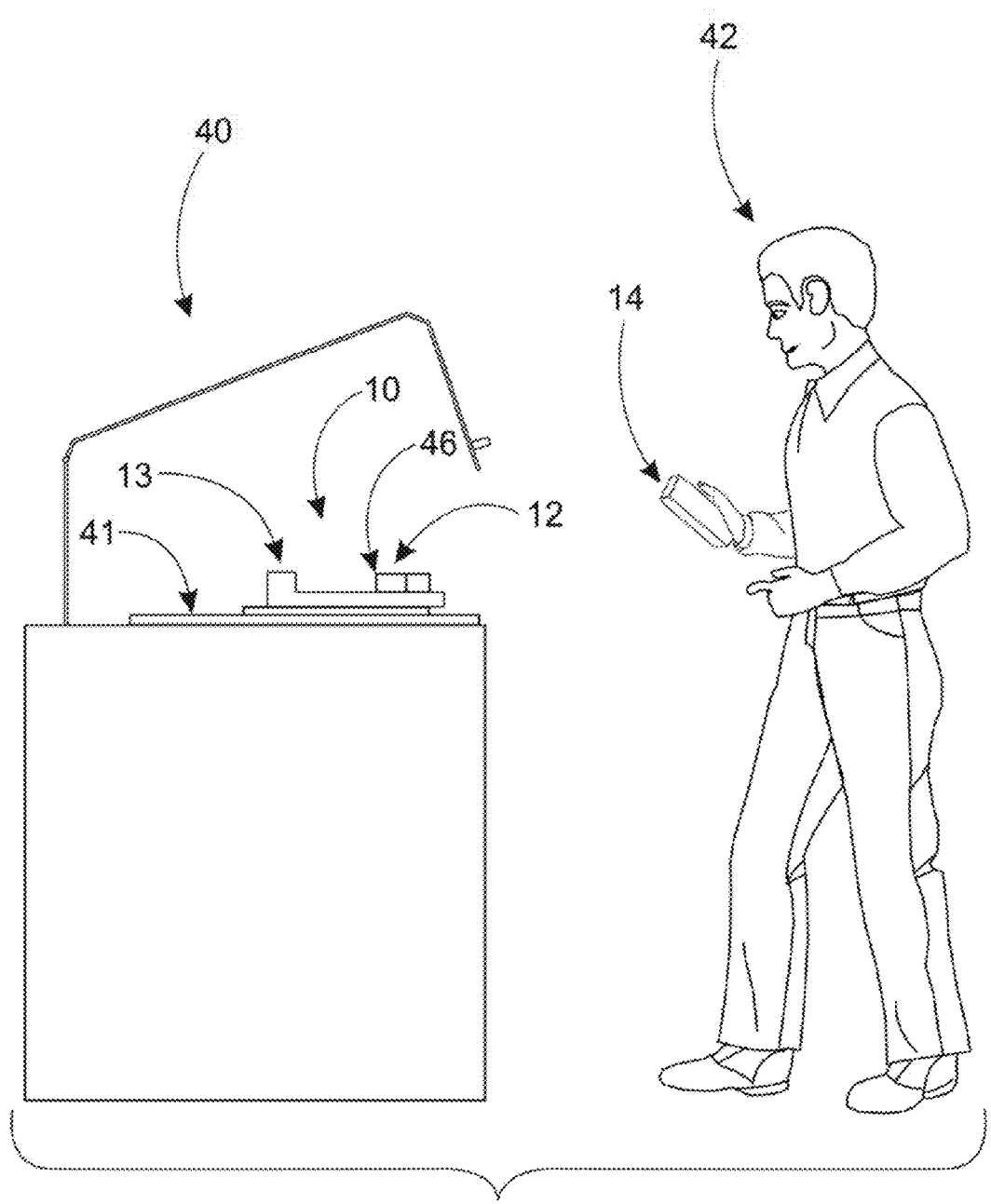
FIG. 8 shows an example of the use of the arrangement in a machine tool.

FIG. 8 shows one example of the operating condition of the device 10 in a machine tool 40. There, the device 10 is mounted to the machine tool 40, to its matrix bench 41 or an equivalent base, for example. The side of the fastening clamp 12 of the device 10 can be disposed at that edge of the machine 40 which is closer to the machinist 42. In this way, the actions for clamping the piece 40, such as screwing and unscrewing of the fastening clamp 12, can be ergonomically performed without the machinist 42 having to reach out deep inside the machine 40. In addition, the device 10 is ergonomically advantageous in vertical machining centres as well. Furthermore, the low and compact construction of the device 10 makes it possible to ergonomically place and remove heavy and large pieces 40 in/from the machine 40. The larger the size of the piece 14, the less the slide 15 extends from the frame 11 of the device 10. For a piece 14 with a large fastening area, the device 10 requires a long distance between the clamping jaws 12.1, 13. Then the slide 15 must be disposed along the frame 11 over a long distance in order that the fixing stopper 13 disposed in it is sufficiently far from the first jaw component 12.1 of the fastening clamp 12.

FIGS. 11a, and 11b, show a further example of the floating mode clamping of a piece 14.3 using the device 10'. Here, the device 10' providing the floating mode clamping is at the centre. The fastening devices 110 disposed at the ends of the piece 14.3 can be, for example, rail fasteners known as prior art. In this application, the fixing stopper on the side of the fastening clamp 12 includes a fitting piece 44 disposed between the jaw component 12.1 and the piece 14.3 to be clamped, for taking into account the large size of the piece 14.3 to be clamped. Thus, it will be evident to those skilled in the art that various fitting pieces 44 may be disposed between the first jaw component 12.1 of the fastening clamp 12 and the piece 14.3 to be clamped and/or between the fixing stopper 13 and the piece 14.3 to be clamped for enabling clamping of the piece 14.3, without departing from the basic idea of the invention. FIG. 11a, shows the fastening arrangement before clamping the piece 14.3 and FIG. 11b, shows the condition after clamping the piece 14.3.

As was mentioned above, the invention also relates to a fastening device 10 for clamping a piece 14. The fastening device 10 includes an arrangement 38 for moving a fixing stopper 13 by means of a fastening clamp 12. Thus, in the device 10, the fixing stopper 13 and the fastening clamp 12 are functionally connectable to each other for varying the position of the fixing stopper 13 relative to the frame 11 by means of the fastening clamp 12 when clamping the piece 14, for example. The fastening device 10, as such, can even form a marketable product, and in the simplest case, any clamp 12 previously purchased, which has earlier been suitable for use in other types of known clamping applications, can be used as the fastening clamp 12.

The invention is described above making reference to applications in which the frame portion 11 of the arrangement and fastening device 10 is composed of one elongated component, which extends from end to end of the arrangement; i.e. between the fixing stoppers 46, 13. However, in long clamping applications, for example, the frame portion can also have two parts. Similarly, the function corresponding with the slide i.e. arrangement 38 can be implemented with two components separated from each other, which can be functionally connected to each other. In this case, too, the movement of one end of the arrangement 38 (at the end of the fastening clamp 12) causes a movement at the opposite end of the arrangement. In this case, a bar, a wire rope or even a transmission connection implemented with a hydraulic medium may be arranged between the parts of the arrangement 38 to provide the movement.

In addition, in the embodiments proposed above, the frame portion 11 has a hole 20, to which the fastening clamp 12 can be fastened. In this case, however, the fastening clamp 12 is all the time immovable relative to the frame 11. According to another embodiment, the connection of the fastening clamp 12 to the frame 11 can also be made moveable. One method for implementing this is, for example, to arrange a T-groove inside the frame 11 and an inner slide moveably disposed in it (not shown). The fastening clamp 12 can be connected to this inner slide using a bolt 35. In addition, instead of the hole 20, the frame 11 can have an elongated opening in the longitudinal direction of the frame 11 for the bolt 35 of the fastening clamp 12. In this opening, the bolt 35 and thereby the entire fastening clamp 12 can be steplessly moved in the longitudinal direction of the frame 11.

By loosening the bolt 35, the inner slide located inside the frame 11 can be released from its fastening against the T-groove and consequently, the fastening clamp 12 can be steplessly moved in the longitudinal direction of the frame 11 to the desired position in the frame 11. When the fastening clamp 12 is in the desired position, the bolt 35 can be retightened. Thus, the inner slide located inside the frame 11 is again clamped against the T-groove and the fastening clamp 12 locks in place relative to the frame 11. Such an arrangement enables quick and stepless positioning of the fastening clamp 12.

A further object of the invention is a fastening clamp 12. In its basic form, the fastening clamp 12 may include a wedge member 17 and first and second jaw components 12.1, 12.2 disposed on its opposite sides. The mutual position of the jaw components 12.1, 12.2 is adapted to be variable with the wedge member 17. The jaw components 12.1, 12.2 are connected to each other with spring elements 21 disposed between them. The fastening clamp 12 is removably mountable to the fastening device 10 by its wedge member 17. The wedge member 17 and/or one of the jaws 12.1 may be equipped with a clamping arrangement 26, 25 for fitting the wedge member 17 and/or the jaw component 12.1 to the fastening device 10 in a positioned manner. In the embodiments proposed above, the fastening arrangement is composed of bores 22, 25, which are disposed on the surface that is on the side of the frame 11 when the wedge member 17 and/or the first jaw component 12.1 are mounted in the device 10. Locking pins 23, also provided with corresponding bores 24.2, 24.2 in the frame 11, can be disposed in the bores 26, 25. It will be evident to those skilled in the art that other constructions for providing such positioning are possible as well.

The invention is also related to a method for clamping a piece 14. In the method, for example, a fastening clamp 12 described above having opposite jaw components 12.1, 12.2 and a wedge member 17 between these, may be used. After fastening the required number of fastening devices 10 to selected positions in the machine tool 40, the distance between the jaws 46, 13 of each fastening device 10 is adjusted suitable for the piece 14. Coarse adjustment of this distance between the damping jaws 46, 13 can take place by varying the position of the clamping jaw 13 disposed in the slide 15 relative to the frame 11. When the fixing screw 35 of the fastening clamp 12 is sufficiently loosened, however so that it cannot detach from the frame 11, the support stopper 16 connected to its second jaw component 12.2 can be lifted off the slide 15. This lifting is allowed by the connection between the jaw components 12.1, 12.2 formed by springs 21, said connection giving in to such an extent that the support stopper 16 and the jaw component 12.2 can be slightly lifted. As a consequence of the lifting of the support stopper 16, the contact of the toothings 37, 30 between it and the slide 15 is lost and the slide 15 can be freely moved relative to the frame 11. The movement of the slide 15 also changes the position of the fixing stopper 13 disposed in it and thus also its distance from the clamping jaw 46. In this coarse adjustment, the fastening clamp 12 and the support stopper 16 remain essentially in place relative to the frame 11, because they are connected to the frame portion 11 via the wedge member 17 of the fastening clamp 12. If this connection were implemented using an inner slide disposed within the frame 11, as described above, it would also be possible to change the position of the fastening clamp 12.

When the distance between the clamping jaws 46, 13 is suitable considering the piece 14, the toothing 37 of the support stopper 16 is set again against the toothing 30 of the slide 15. Chamfered toothings 30, 37 oriented towards the fixing stopper 13 make it quicker to find the tooth contact between the slide 15 and the support stopper 16. The piece 14 is placed between the clamping jaws 46, 13 included in the fastening device 10. If, even after a coarse adjustment, the total gap between the piece 14 and the clamping jaws 46, 13 is larger than the pitch of the clamping teeth 30, 37, this gap can be further decreased (or increased) in the manner described above by lifting the support stopper 16 off the slide 15.

When the piece is between the clamping jaws 46, 13, the distance between the clamping jaws 46, 13 is decreased for clamping the piece 14 between these. The distance is decreased by pushing the wedge member 17 of the fastening clamp 12 between its jaws 12.1, 12.2 towards the frame portion 11. The pushing action is performed by inserting the fixing screw 35 of the wedge member 17 to the frame portion 11.

If both jaw components 12.1, 12.2 of the fastening clamp 12 are without locking to the frame 11 (FIG. 5), they can freely move to the opposite directions. Since one of the clamping jaws 46 is formed by means of the fastening clamp 12, particularly with its first jaw component 12.1, this jaw 12.1 pushes the piece 14 on the side of the fastening clamp 12. Similarly, the other jaw 12.2 of the fastening clamp 12 pushes the support stopper 16 causing the slide 15 and the fixing stopper 13 connected thereto on the other side of the piece 14 to move and consequently, the fixing stopper 13 also pushes the piece 14 from the opposite side. Thus, the. second jaw component 12.2 of the fastening clamp 12 is arranged to act on the other fixing stopper 13 to move it. Thus, the fastening clamp 12 and particularly its second clamping jaw 12.2 are functionally connected to the second fixing stopper 13 by means of the arrangement 38, and its position relative to the frame 11 can be varied by means of the fastening clamp 12 when clamping a piece 14, for example.

If the second jaw component 12.1 of the fastening clamp 12 is locked to the frame portion 11 (FIG. 7), only the opposite jaw component 12.2 can move freely. This jaw 12.2 again pushes the support stopper 16 causing the slide 15 and the fixing stopper 13 connected thereto to move again and, consequently, the fixing stopper 13 also pushes the piece 14 from the opposite side of the fastening clamp 12. The clamping jaw 12.1 of the fastening clamp 12 placed against the piece 14 remains then in place.

Removing the piece 14 from the arrangement and device 10 is performed by opening the fixing screw 35 of the wedge member 17 of the fastening clamp 12. When the fixing screw 35 is opened, the wedge member 17 can rise upwards between the jaw components 12.1, 12.2, causing the jaw components 12.1, 12.2 to return towards each other pulled by the springs 21 that connect them. Then, the jaw component 12.1 of the fastening clamp 12 that was against the piece 14 can detach from the piece 14, if it was not positioned in the frame portion 11 according to the embodiment of FIG. 7. The fixing stopper 13 located on the opposite side of the piece 14 relative to the fastening clamp 12 also detaches from the piece 14, because, due to the opening of the fixing screw 35 of the fastening clamp 12, the jaw component 12.2 that acted on the slide 15 via the support stopper 16 is drawn to the opposite direction compared to that during its expansion. As a consequence of this, the support stopper 16 can be moved for a small distance towards the piece 14, whereat the slide 15 and the fixing stopper 13 disposed therein also move and the fixing stopper 13 becomes separated from the piece 14.

A still further object of the invention is a system for clamping a piece 14, 14.1-14.3 to a machine tool 40. The system includes a base 41 disposable or included in the machine tool 40 equipped with fixing stoppers 45 (FIG. 10) and at least one fastening device 10, with which the piece 14 is adapted to be clamped to the machine tool 40 for machining performed therein. The fastening device 10, the number of which can be one or more in the system, includes the parts included in the arrangement proposed above.

It is to be understood that the above description and the related figures are only meant for illustrating the present method and arrangement according to the invention. Thus, the invention is not only limited to the embodiments proposed above or those defined in the claims, but many different variations and modifications of the invention, which are possible within the inventive idea defined in the appended claims, will be evident to those skilled in the art.

The invention claimed is:

1. An apparatus for clamping a piece, said apparatus including
   a frame portion adapted to be fastened to a base,
   a fastening damp disposed in the frame, having first and second jaw components on the opposite sides and a wedge member fitted therebetween,
   a fixing stopper, the piece being adapted to be clamped between the fixing stopper and the first jaw component of the fastening clamp,
   an arrangement disposed between the second jaw component of the fastening clamp and the fixing stopper, functionally connecting said second jaw component of the fastening clamp and the fixing stopper to each other, for moving the fixing stopper by means of the fastening clamp which arrangement includes a slide, moveably fitted to the frame portion, in which the fixing stopper is disposed and on which the fastening clamp is adapted to act.

2. The apparatus according to claim 1, wherein a support stopper is removably adaptable to the slide for the fastening clamp, on which support stopper the second jaw component of the fastening clamp can be adapted to abut.

3. The apparatus according to claim 2, wherein the fastening clamp is fastened to the support stopper.

4. The apparatus according to claim 2, wherein bonding profiles are disposed in the support stopper and the slide for adjusting the distance between the fixing stopper and the fastening clamp.

5. The apparatus according to claim 1, wherein the fastening clamp is floatingly disposable to the frame portion.

6. The apparatus according to claim 1, wherein at least part of the fastening clamp is disposable to the frame portion in a positioned manner.

7. The apparatus according to claim 6, wherein the part positioned to the frame portion of the fastening clamp is a wedge member.

8. The apparatus according to claim 6, wherein the part positioned to the frame portion of the fastening clamp is the first jaw component thereof.

9. A fastening device for clamping a piece, said fastening device including
   a frame portion adapted to be fastened to a base,
   at least one fastening position disposed in the frame portion for a fastening clamp, having first and second jaw components on the opposite sides and a wedge member fitted therebetween,
   a fixing stopper, the piece being adapted to be clamped between the fixing stopper and the first jaw component of the fastening clamp,
   an arrangement disposable between the second jaw component of the fastening clamp and the fixing stopper, functionally connecting said second jaw component of the fastening clamp and the fixing stopper to each other, for moving the fixing stopper by means of the fastening clamp which arrangement includes a slide, moveably fitted to the frame portion, in which the fixing stopper is disposed and on which the fastening clamp is adapted to act.

10. A fastening clamp including
    a wedge member by means of which the fastening clamp is removeably mountable to a fastening device,
    first and second jaw components disposed on the opposite sides of the wedge member, the mutual position of which is adapted to be varied with the wedge member and which are connected to each other by means of spring members disposed between them,
    and in which fastening clamp the wedge member and/or one of the jaw components is equipped with a positioning arrangement for disposing the wedge member or the jaw component in the fastening device in a positioned manner.

11. A method for damping a piece, wherein
    a piece is placed between the fixing stoppers included in a fastening device,
    the distance between the fixing stoppers is reduced for damping the piece between them,
    and wherein a fastening clamp is used having first and second jaw components on the opposite sides and a wedge member disposed therebetween, and
    one of the fixing stoppers is formed with the first jaw component of the fastening clamp,
    the second jaw component of the fastening clamp is arranged to act on the other fixing stopper to move it,
    the position of the second fixing stopper is varied with the second jaw component of e fastening clamp.

12. A system for clamping a piece to a machine tool, said system including
    a base, equipped with fixing stoppers, disposable in a machine tool,
    at least one fastening device including
    a frame portion adapted to be fastened to a base,
    a fastening clamp disposed in the frame portion, having first and second jaw components on the opposite sides and a wedge member fitted therebetween,
    a fixing stopper of the fastening device, the piece being adapted to be clamped between the fixing stopper and the first jaw component of the fastening clamp,
    an arrangement disposed between the second jaw component of the fastening clamp and the fixing stopper of the fastening device, functionally connecting said second jaw component of the fastening clamp and the fixing stopper of the fastening device to each other, for moving the fixing stopper of the fastening device by means of the fastening clamp which arrangement includes a slide, moveably fitted to the frame portion, in which the fixing stopper is disposed and on which the fastening clamp is adapted to act.

* * * * *